United States Patent [19]
Toyoda

[11] Patent Number: 4,570,728
[45] Date of Patent: Feb. 18, 1986

[54] COMBINATION WEIGHING SYSTEM
[75] Inventor: Yoshiharu Toyoda, Akashi, Japan
[73] Assignee: Yamato Scale Company, Limited, Akashi, Japan
[21] Appl. No.: 664,501
[22] Filed: Oct. 25, 1984
[30] Foreign Application Priority Data Oct. 31, 1983 [JP] Japan ................. 58-205620

[51] Int. Cl.$^4$ ................. G01G 19/22; G01G 19/52
[52] U.S. Cl. ................. 177/25; 177/1; 177/50
[58] Field of Search ................. 177/1, 25, 50, DIG. 12

[56] References Cited
U.S. PATENT DOCUMENTS

| 4,441,567 | 4/1984 | Hirano | 177/25 |
| 4,466,499 | 8/1984 | Minamida et al. | 177/25 X |
| 4,466,500 | 9/1984 | Hirano | 177/25 X |
| 4,470,166 | 8/1984 | Mosher et al. | 177/1 |
| 4,512,427 | 4/1985 | Minamida | 177/1 |

Primary Examiner—George H. Miller, Jr.
Attorney, Agent, or Firm—Senniger, Powers, Leavitt and Roedel

[57] ABSTRACT

A novel combination weighing system which substantially reduces the necessary time for each cycle of operation as compared with the conventional combination weighing system. The system involves sampling a weight indicative signal at a predetermined time point prior to each weighing unit reading stabilization, calculating from each unstable weight indicative signal an estimated stable weight indicative value, executing a combination operation using the estimated stable weight indication values, storing those combinations obtained which satisfy a predetermined weight condition, and calculating the sum weights of the stored combinations using weight indicative signals obtained after stabilization of the weighing units to select a combination whose sum weight satisfies the predetermined weight condition.

9 Claims, 3 Drawing Figures

COMBINATION WEIGHING SYSTEM

This invention relates to a combination weighing system, and, especially to a novel and improved combination weighing system which enables significant reduction of the necessary time for each cycle of its operation.

A combination weighing system is arranged generally to weigh products simultaneously by a plurality of weighing units to obtain weight indicative signals, to combine them in various fashion to select a combination whose sum weight satisfies a predetermined weight condition, and to discharge and collect the products in those weighing units participating in this combination, for delivery to a packing machine or the like. U.S. Pat. No. 3,939,928 for example, discloses the combination weighing principle. However, after being loaded with product each weighing unit requires a substantial length of time for its weight indicative signal to stabilize and it is necessary to wait for stabilization in order to improve accuracy of measurement. However, this time required for stabilization is significantly longer than the time required for the subsequent combination arithmetic operation, and has occupied most of the cycle time of the device to impede improvement of its efficiency. Although many efforts were made for reducing the stabilization time of a weighing unit, they were confined by correlation with measuring accuracy and have reached their limits. U.S. Pat. Nos. 4,385,671 and 4,470,166 have proposed to improve efficiency of the device with the stabilization time left unchanged. The proposed system is so-called "double-shift" system, in which, before the weighing units having participated in a selected combination reach stabilization after being reloaded, the next combination operation is initiated with the weight signals from those weighing units which were not included in the preceding combination. The "double-shift" system is epoch-making in view of efficiency improvement, but the number of weighing units included in each device must be at least twice the number of weighing units forming the selected combination. As a result, the device has become massive and expensive.

Accordingly, an object of this invention is to provide combination weighing method and device which can significantly reduce the time needed for each cycle of operation without an increase in the number of weighing units as in the "double-shift" system.

The invention is based upon a discovery of the fact that the necessary cycle time is shorter when the combination operation is effected by sampling the weight signals at a specific time point before stabilization of each weighing unit and providing a suitable correction and then, after a combination satisfying a predetermined condition is selected, add this combination for allowability using weight signal obtained after stabilization, rather than the prior art system wherein the combination operation is not initiated until after stabilization of the weight signals.

According to the combination weighing system of this invention, a plurality of weighing units are loaded respectively with products and resultant weight indicative signals are sampled before they reach stabilization. A predetermined estimated deviation is subtracted from each signal to calculate an estimated value of the weight indicative signal after stabilization. A conventional combination arithmetic operation is effected with such estimated values of respective weighing units and all of those combinations satisfying a predetermined weight condition are stored. After the respective weighing units have reached stabilization, their weight indicative signals are sampled again and summed in accordance with the stored combinations to select a combination whose sum satisfies a predetermined weight condition for delivery of products from the weighing units belonging to this combination.

These and other objects and features of this invention will be described in more detail below in conjunction with an embodiment thereof with reference to the accompanying drawings.

Figures 1, 3:
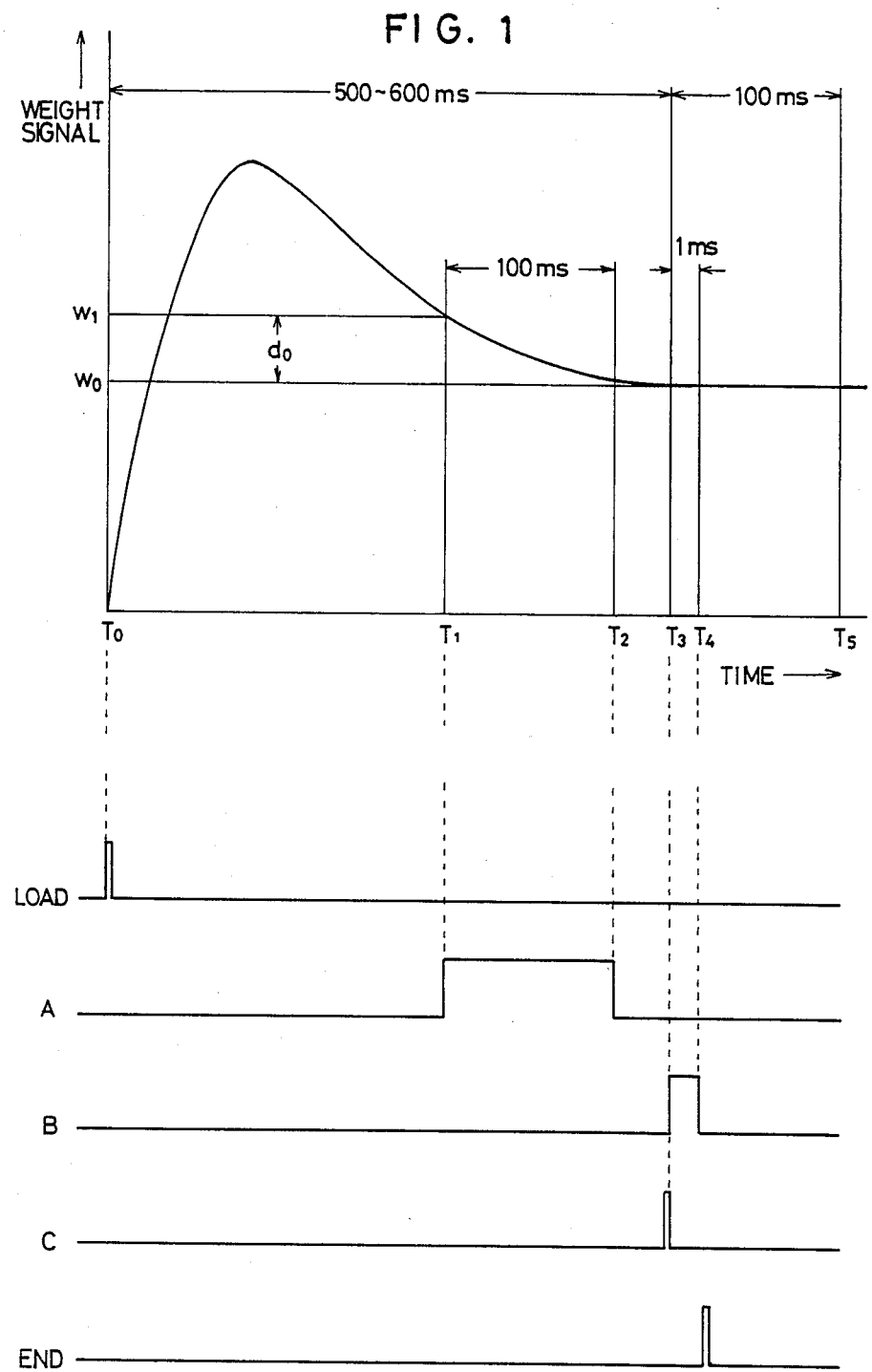
FIG. 1 is a diagram representing a time-rate of change of the weight indicative signal of a weighing unit, used for an aid of explanation of the operational effect of this invention, the time axis of the diagram being partially exaggerated in scale for convenience.
FIG. 3 is a signal waveform diagram representing timing signals utilized in the operation of the system of FIG. 2, as shown in time correspondence to the diagram of FIG. 1.

As shown in FIG. 1, the weight indicative signal produced by each weighing unit of a typical modern combination weighing machine increases abruptly after loading at time $T_0$ up to a maximum value and, then, decreases gradually to a stable value $w_0$ at time $T_3$. The time interval between $T_0$ and $T_3$ is generally 500 to 500 milliseconds. In the prior art system, the combination operation is effected after time $T_3$ and the desired combination selection ends at time $T_5$ after about 100 milliseconds. Accordingly, the time interval from time $T_0$ to time $T_5$ is about 600 to 700 milliseconds, most of which is required for stabilization of the weighing unit. In the system of this invention, the combination operation effected within the 100 millisecond interval between $T_3$ and $T_5$ is effected within the 100 millisecond interval between $T_1$ and $T_2$ which is prior to time $T_3$, and the abovementioned combination selection step is effected within the interval between $T_3$ and $T_4$. As the latter operation requires only about one millisecond, it is possible to obtain a time reduction of about 100 milliseconds, that is, about 20 percent as compared with the prior art system.

Figure 2:
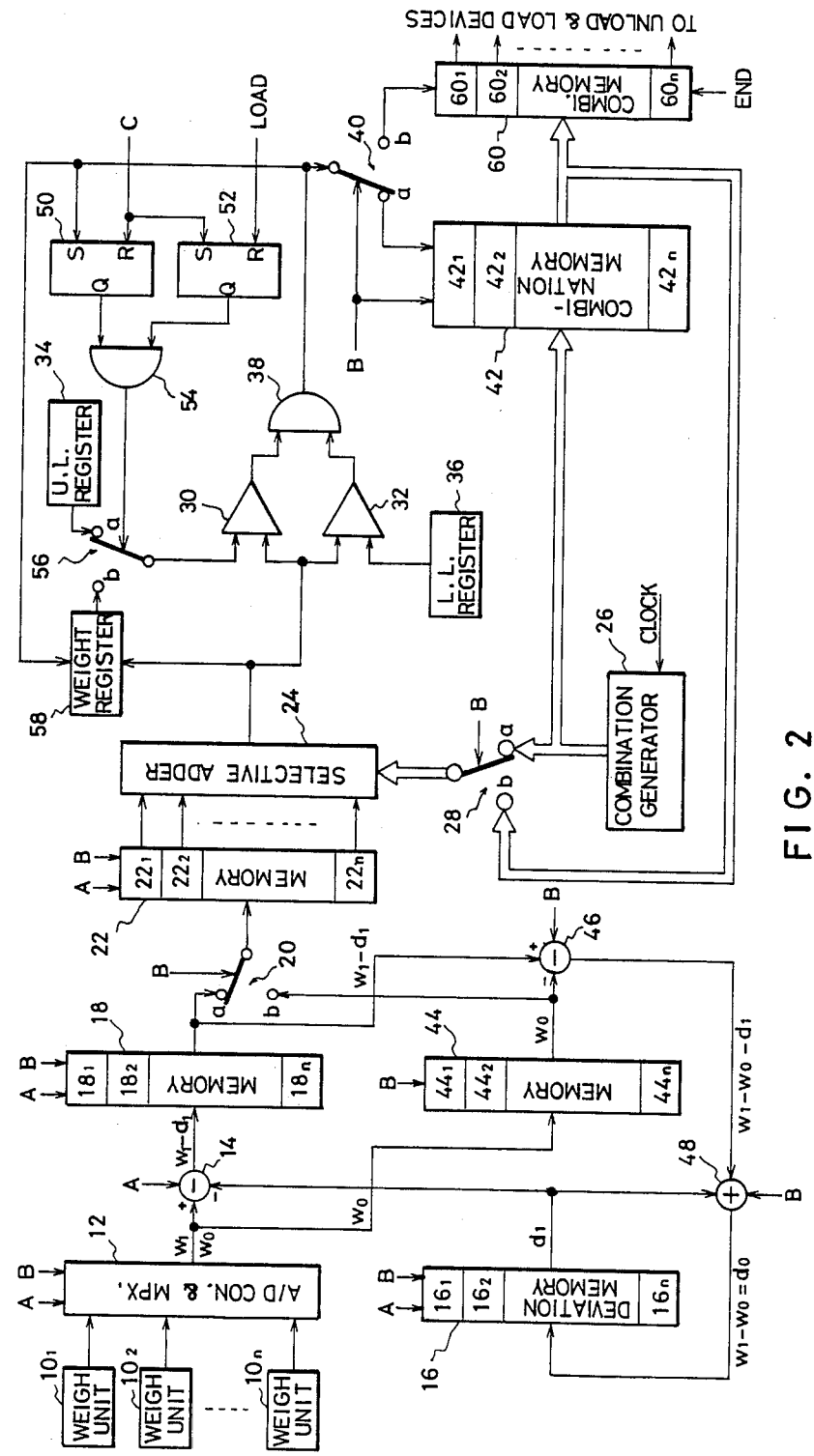
FIG. 2 is a schematic block diagram representing an embodiment of a combination weighing system according to this invention.

FIG. 2 shows an embodiment of circuit arrangement in which the system of this invention is embodied. In the drawing, weight indicative signals produced by a plurality of (n) weighing units $10_1, 10_2, \ldots 10_n$ are applied respectively to inputs of an analog-to-digital convertor and multiplexer (A/D Con. and MPX.) 12 which is energized by a timing signal A of FIG. 3 to receive weight indicative signal $w_1$ from each weighing unit at time $T_1$ of FIG. 1 and to digitize and apply it sequentially in time division fashion to the plus (+) terminal of a subtracter 14, under control of a built-in control device. Output signals of a deviation memory 16 are applied to the minus (−) terminal of the subtracter 14. The deviation memory 16 has n memory locations $16_1, 16_2, \ldots 16_n$ rerresponding respectively to the weighing units $10_1, 10_2, \ldots 10_n$ and suitable values of deviation $d_1$ can be written therein individually by an input device, such as key-board, not shown. The deviation $d_1$ is an estimated value of the difference $d_0$ between the weight signal value $w_1$ at time $T_1$ and its stable value $w_0$ after time $T_3$ and may be determined experimentally based upon the characteristic of each weighing unit. The deviation memory 16 is also energized by the timing signal A to read the values of deviation $d_1$ in the respective memory locations in synchronism with the multiplexer 12 and to apply them sequentially in time division fashion to the subtracter 14.

The subtracter 14 calculates the difference $w_1-d_1$ of both input signals and supplies sequentially this difference, that is, an estimated value of the stable value $w_0$ of weight indicative signal to an estimated weight memory 18. The memory 18 has n memory locations $18_1, 18_2, \ldots 18_n$ corresponding respectively to the weighing units $10_1, 10_2, \ldots 10_n$ and is energized by the timing signal A to write incoming estimated values $w_1-d_1$ sequentially in the corresponding memory locations and also apply them sequentially to a fixed contact a of a single-pole double-throw switch 20, under control of a built-in control device. The movable arm of the switch 20 is normally in contact with the fixed contact a and the output signals of the memory 18 are applied through the switch 20 to a memory 22. Similarly to the memory 18, the memory 22 is also energized by the timing signal A to write incoming signals respectively in corresponding n memory locations $22_1, 22_2, \ldots 22_n$, under control of a built-in control device. Now, the estimated values of weight indicative signals of the weighing units $10_1, 10_2, \ldots 10_n$ in their stable state have been stored in the respective stages of memory 22.

The stages $22_1, 22_2, \ldots 22_n$ of memory 22 are connected in parallel to a selective adder 24, and n-but control signals are applied to the control input of the selective adder 24 from a combination generator 26 through an n-pole double-throw switch 28 and a multiwire cable as indicated by a wide arrow. The combination generator 26 generates logic high and low levels at its n bit outputs in accordance with predetermined combinations, and the selective adder 24 sums the input signals from the memory 22 corresponding to the logic high levels to provide combined sum signals, successively. The arrangement of combination generator 26 and selective adder 24 is common to combination weighing devices and its configuration and operation are described in detail in U.S. Pat. No. 4,336,852, for example, so that no further description will be made here.

The sum signals calculated in accordance with predetermined combinations are sequentially applied to one input of each of two comparators 30 and 32. The other input of the comarator 30 is coupled through a fixed contact a of a single-pole double-throw switch 56 to an upper limit resigter 34, and the other input of the comparator 32 is coupled directly to a lower limit register 36. Upper and lower threshold values of a predetermined allowable range of the sum weights are registered in the upper and lower limit registers 34 and 36, respectively, by means of an input device such as keyboard, not shown. The comparators 30 and 32 are arranged to produce output signals, respectively, when the output sum signal of the selective adder 24 falls within the predetermined range and, at this time, an AND gate 38 receiving the output signals of both comparators produces an acceptance signal. The acceptance signal is applied through a fixed contact a of a single-pole double-throw switch 40 to a combination memory 42 as its control signal.

The memory 42 has n stages $42_1, 42_2, \ldots 42_n$ corresponding respectively to weighing units $10_1, 10_2, \ldots 10_n$, which are coupled respectively to n outputs of the combination generator 26 through an n-bit multiwire cable. The combination memory 42 stores a current input signal, which is an n-bit binary digit, every time it receives the acceptance signal from the AND gate 38 and, when the combination selecting operation has finished, it is storing all combinations having their sum weights within the abovementioned allowable range. This time point is $T_2$ of FIG. 1 and it is necessary to set the leading edge of the timing signal A, which is the start point $T_1$, so that time $T_2$ is earlier than time $T_3$ at which the weight signal becomes stable.

The timing signal A ends at about time $T_2$ and another timing signal B occurs next at time $T_3$. As described above, $T_3$ is the time point at which the weight indicative signal of each weighing unit reaches its stable state and can be known previously by studying the characteristic curve of each weighing unit. The timing signal B turns switches 20, 28 and 40 from fixed contacts a to fixed contacts b and, also, energizes the elements 12, 16, 18, 22, 42, 44, 46 and 48 to start their operations, as described below.

The timing signal B is applied first to A/D Con. and MPX. 12 to energize it to apply current weight indicative signals $w_0$ sequentially to an n-stage memory 44 which is similar to the memory 18, under control of its control device. The memory 44 is also energized by the signal B to write these weight signals $w_0$ of weighing units $10_1, 10_2, \ldots 10_n$ in the respective stages $44_1, 44_2, \ldots 44_n$ and, then, apply them sequentially through the minus ($-$) input of subtracter 46 and switch 20 to memory 22, under control of its built-in control device. On the other hand, the memory 18 energized by timing signal B applies the estimated weight values $w_1-d_1$ stored in its stages sequentially to the plus ($+$) input of subtracter 46, as in the case of timing signal A. Thus, the subtracter 46 effects subtraction of both input signals and applies their difference $w_1-w_0-d_1$ to one input of an adder 48, the other input of which is coupled to the output of deviation memory 16. The memory 16 is also energized by timing signal B to supply the estimated deviations $d_1$ stored therein to adder 48, sequentially. Thus, the adder 48 sums both input signals to obtain a sum $w_1-w_0=d_0$ and supplies it to memory 16 to update its content from $d_1$ to $d_0$. As shown in FIG. 1, $d_0$ is deviation of non-stabilized weight $w_1$ from stabilized weight $w_0$ and is higher in accuracy than the estimated deviation $d_1$. The value $d_0$ is used in the next operation cycle in place of $d_1$, thereby further improving reliability of weight indicative signals supplied from memory 18 to memory 22.

On the other hand, the stable weight indicative signals $w_0$ supplied from memory 44 through switch 20 to memory 22 are applied also to selective adder 24 in response to timing signal B. Due to turnover of the switch 28, the selective adder 24 is no longer controlled by the combination generator 26 and its combination control signals are supplied from the combination memory 42 through an n-bit multiwire cable and switch 28 as shown in FIG. 2. While the combination memory 42 is storing information relating to plural combinations selected during the selecting operation in the first step as described above, it is energized by timing signal B to apply them sequentially to selective adder 24 and second combination memory 60 under control of its built-in control device. Thus, the selective adder 24 sums the incoming weight indicative signals $w_0$ in accordance with its combination information and applies the resultant sum signals to comparators 30 and 32. Similarly, if each of these sum signals falls within the upper and lower limits stored respectively in registers 34 and 36, and AND gate 38 provides an acceptance signal through switch 40 to combination memory 60. The combination memory 60 has n memory locations $60_1$, $60_2, \ldots 60_n$ connected respectively to the stages $42_1$, $42_2, \ldots 42_n$ of combination memory 42, and is arranged to store a current output signal of combination memory 42 therein in response to the acceptance signal.

The output sum signal of selective adder 24 is also applied to an input of weight registor or memory 58 which is arranged to respond to the acceptance signal from AND gate 38 to update its content to the current input signal. The output of memory 58 is connected to another fixed contact b of single-pole double-throw switch 56. The output of AND gate 38 is also coupled to "set" terminal S of flip-flop circuit 50 whose Q output is connected to one input of AND gate 54. The other input of AND gate 54 is connected to the Q output of second flip-flop circuit 52 and the output of AND gate 54 is connected to a control terminal of switch 56. While the flip-flop 52 has been reset previously by a loading signal LOAD applied to its "reset" terminal R at time $T_0$, as shown in FIGS. 1 and 3, it is set by a timing signal C applied to its "set" terminal S at time $T_3$. While the flip-flop 50 is reset by the timing signal C applied to its "reset" terminal R, it is set by the acceptance signal from AND gate 38. Thus, the AND gate 54 produces an output signal to turn the switch 56 to the fixed contact b. This causes the comparator 30 to use thereafter the content of weight register 58 as the upper limit of allowable range of weight in place of the content of upper limit register 34, and this status is maintained until the flip-flop 52 is reset by the next loading signal LOAD. As the content of weight memory 58 is updated to current input in response to acceptance signal from AND gate 38, it approaches gradually the content of lower limit register 36. At the same time, as the content of combination memory 60 is also updated to current input combination information in response to every acceptance signal, combination memory 60 should store a combination whose sum weight falls within a predetermined range of weight and is equal or nearest to the lower limit of all possible combinations, that is, the desired combination. This time point is $T_4$ of FIG. 1 and the interval between time $T_3$ and time $T_4$ is only one millisecond, as described above. The content of combination memory 60 is applied to unloading and loading devices of respective weighing units in response to an end signal END appearing just after this time point, to unload and load those weighing units specified by the combination information (for example, high level outputs).

The source of the timing signals of FIG. 3 has neither been shown nor been described since it can be easily designed and manufactured by those skilled in the art. The flip-flop 52 is provided for preventing the switch 56 from turning over in the first step of combination operation with the estimated weight signals $w_1 - d_1$, and it is possible to use other means such as actuation of flip-flop 50 by timing signal B. While the control device built in each memory has not been described, it can also be designed adequately by those skilled in the art. While the information transfer between the elements 12 to 22 and 44 to 48 has been described as being effected in time division fashion; concurrent transfer can be effected by means of multiwire cables and multipole switches. In this case, the number of the elements 14, 46 and 48 must be n each.

Although the above embodiment has been arranged to obtain a combination whose sum weight is within a predetermined range and equal or nearest to the lower limit of this range, the weight condition is not limited thereto. For example, the condition may be set such that the sum is merely equal or nearest to a predetermined target value, or that it is merely with a predetermined range of weight. Suitable selecting circuits for these conditions can be designed easily with reference to the circuits disclosed in U.S. Pat. No. 2,089,153, for example.

I claim:

1. A combination weighing method, comprising the steps of:
    loading each of a plurality of weighing units with products to be weighed and sampling the resultant weight indicative signals before they become stable,
    subtracting a predetermined estimated deviation from each of said sampled unstable weight indicative signals to calculate an estimated value of the weight indicative signal having become stable,
    effecting predetermined combination arithmetic operations with said calculated estimated values and storing the resultant information indicative of all combinations whose sum weights satisfy a predetermined weight condition,
    summing said sampled stable weight indicative signals in accordance with said stored combinations to select from said stored combinations a combination whose sum weight satisfies a predetermined weight condition.

2. The method according to claim 1, wherein the difference between said unstable weight indicative signal and said stable weight indicative signal is calculated and then used in place of said predetermined estimated deviation.

3. A combination weighing device, comprising:
    a plurality of weighing units for weighing product, each unit being adapted to produce a weight indicative signal,
    means for sampling said weight indicative signals before they become stable after loading of said weighing units,
    means for subtracting a predetermined estimated deviation from each of said sampled unstable weight indicative signals to calculate an estimated value of said weight indicative signal having become stable,
    means for effecting predetermined combination arithmetic operations with said calculated estimated values and storing the resultant information indicative of all combinations whose sum weights satisfy a predetermined weight condition,
    means for sampling said weight indicative signals after they become stable, and
    means for summing said sampled stable weight indicative signals in accordance with said stored combinations to select from said stored combinations a combination whose sum weight satisfies a predetermined weight condition.

4. The device according to claim 3, wherein said device further comprises means for calculating the difference between said unstable weight indicative signal and said stable weight indicative signal, and means for substituting said calculated difference for said predetermined estimated deviation.

5. The device according to claim 3, wherein said combination selecting means include means for selecting a combination whose sum weight satisfies a second weight condition in addition to said predetermined weight condition.

6. A combination weighing method comprising the steps of:
- loading a plurality of weighing units with product to be weighed, each unit being adapted to generate a signal indicative of the weight of product on the unit, said weight-indicative signal being unstable for a period of time after the unit is loaded;
- sampling the unstable weight-indicative signals of the weighing units;
- calculating from each unstable weight-indicative signal an estimated stable weight-indicative value; and
- effecting combination arithmetic operations using said estimated stable weight-indicative values to obtain information indicative of one or more combinations each having a sum weight which satisfies a predetermined weight condition.

7. The method of claim 6 further comprising the steps of: storing said information indicative of said one or more combinations;
- sampling said weight-indicative signals after they become stable; and
- effecting combination arithmetic operations in accordance with said one or more combinations using said stable weight-indicative signals to obtain information indicative of the sum weights of said one or more combinations to select therefrom a combination having a sum weight which satisfies a predetermined weight condition.

8. The method of claim 7 wherein said estimated stable weight-indicative value is calculated by subtracting a predetermined estimated deviation from said sampled unstable weight-indicative signal.

9. The method of claim 8 wherein, in carrying out said step of effecting combination arithmetic operations using said stable weight-indicative signals, said predetermined estimated deviation is replaced by the difference between said unstable weight-indicative signal and said stable weight-indicative signal.

* * * * *

UNITED STATES PATENT AND TRADEMARK OFFICE
CERTIFICATE OF CORRECTION

PATENT NO. : 4,570,728

DATED : February 18, 1986

INVENTOR(S) : Yoshiharu Toyoda

It is certified that error appears in the above—identified patent and that said Letters Patent is hereby corrected as shown below:

Column 1, line 18, "3,939,928 for" should read -- 3,939,928, for --. Column 1, line 19, "product each" should read -- product, each --. Column 1, line 20, "stabilize and" should read -- stabilize, and --. Column 1, line 54 "correction" should read -- correction, --. Column 1, line 56, "add" should read -- checking --. Column 2, line 32, "500 to 500" should read -- 500 to 600 --. Column 2, line 62, "n" should read -- $\underline{n}$ --. Column 2, line 63, "rerresponding" should read -- corresponding --. Column 3, line 12, "n" should read -- $\underline{n}$ --. Column 3, line 17, "a" (second occurrence) should read -- $\underline{a}$ --. Column 3, line 20, "a" should read -- $\underline{a}$ --. Column 3, line 25, "n" should read -- $\underline{n}$ --. Column 3, line 34, "n-pole" should read -- $\underline{n}$-pole --. Column 3, line 37, "n" should read -- $\underline{n}$ --. Column 3, line 51, "a" (first occurrence) should read -- $\underline{a}$ --. Column 3, line 52, "resigter" should read -- register --. Column 3, line 64, "a" (second occurrence) should read -- $\underline{a}$ --. Column 3, line 67, "n" should read -- $\underline{n}$ --. Column 4, line 1, "n" should read -- $\underline{n}$ --. Column 4, line 2, "n-bit" should read -- $\underline{n}$-bit --. Column 4, line 4, "n-bit" should read

UNITED STATES PATENT AND TRADEMARK OFFICE
CERTIFICATE OF CORRECTION

PATENT NO. : 4,570,728

DATED : February 18, 1986

INVENTOR(S) : Yoshiharu Toyoda

It is certified that error appears in the above—identified patent and that said Letters Patent is hereby corrected as shown below:

-- $\underline{n}$-bit --. Column 4, line 20, "a" should read -- $\underline{a}$ --. Column 4, line 20, "b" should read -- $\underline{b}$ --. Column 4, line 25, "n-stage" should read -- $\underline{n}$-stage --. Column 4, line 59, "n-bit" should read -- $\underline{n}$-bit --. Column 5, line 6, "n" should read -- $\underline{n}$ --. Column 5, line 16, "b" should read -- $\underline{b}$ --. Column 5, line 31, "b" should read -- $\underline{b}$ --. Column 6, line 2, "n" should read -- $\underline{n}$ --.

Signed and Sealed this

Twenty-eighth Day of October, 1986

[SEAL]

Attest:

DONALD J. QUIGG

Attesting Officer

Commissioner of Patents and Trademarks